United States Patent [19]

Kelly

[11] 4,082,969
[45] Apr. 4, 1978

[54] MAGNETIC TORQUE CONVERTER

[76] Inventor: Donald A. Kelly, 58-06 69th Pl., Maspeth, New York, N.Y. 11378

[21] Appl. No.: 831,269

[22] Filed: Sep. 7, 1977

[51] Int. Cl.² .......................................... H02K 49/06
[52] U.S. Cl. ..................................... 310/103; 310/80
[58] Field of Search ................... 310/80, 92, 94, 103

[56] References Cited

U.S. PATENT DOCUMENTS

| 968,574 | 8/1910 | Lecoche | 310/103 X |
|---|---|---|---|
| 1,337,732 | 4/1920 | Stoller | 310/103 |
| 2,096,906 | 10/1937 | Lilja | 310/103 |
| 3,422,297 | 1/1969 | De Bennetot et al. | 310/80 |
| 3,523,204 | 8/1970 | Rand | 310/94 |
| 3,814,962 | 6/1974 | Baermann | 310/103 |

Primary Examiner—Donovan F. Duggan

[57] ABSTRACT

The magnetic torque converter consists of two basic components, -
 a large flat disc/wheel containing multiple equally spaced permanent magnets arrayed so that all poles attract at the disc periphery, - and a,
 driving helical rotor fitted with similar permanent attracting magnets which are equally spaced on the outer helical surface. The pitch of the helical rotor is single or equal to the spacing between two adjacent magnets on the disc/wheel.

The disc/wheel and helical rotor are made of non-magnetic durable metal and arranged in the same manner as a mechanical worm and worm wheel. The axes of the two rotating components may be at a right angle to each other, or slightly skewed to favor one direction of rotation or the other, depending on the end application of the unit.

10 Claims, 4 Drawing Figures

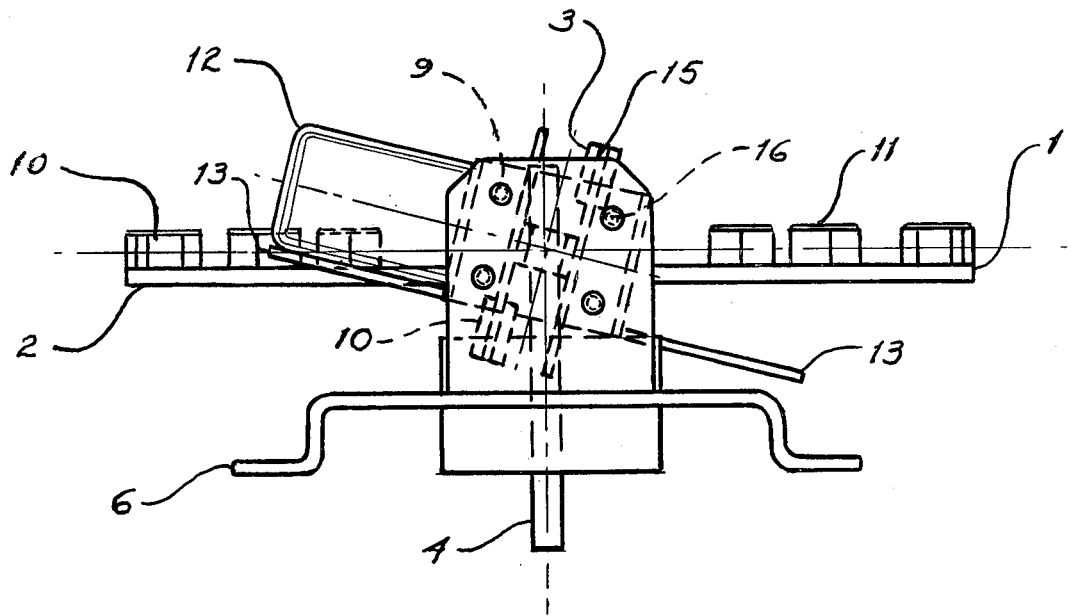
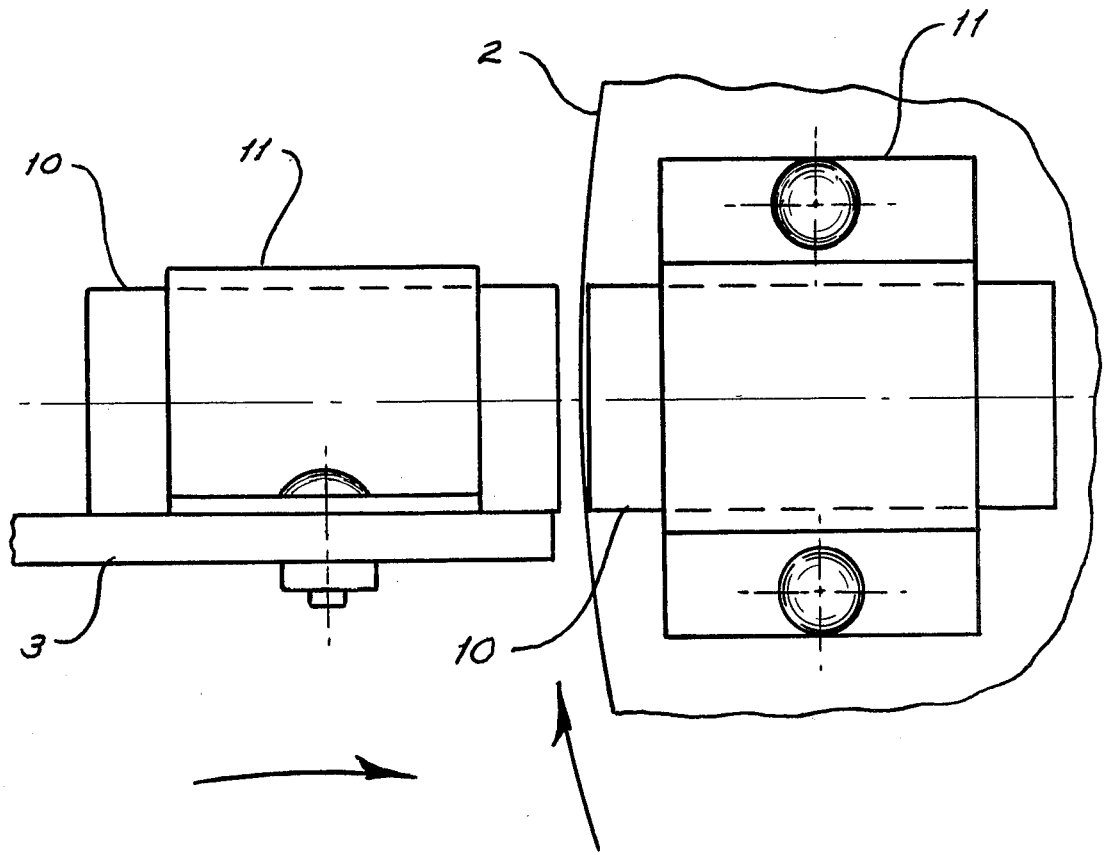

MAGNETIC TORQUE CONVERTER

BACKGROUND OF THE INVENTION

Numerous permanent magnet actuators, couplings and so-called motors have been designed and built with the prime objective of increasing the power advantage and torque output from various multiple magnet arrangements and geometries. Some of these devices consist of multiple permanent-magnets which are shifted or -shunted, mechanically or electrically, in such a way as to cause continuous rotation.

None of these various devices and arrangements have become successful and commercially attractive because of their generally low-speed/torque output and relatively poor cost-effectiveness.

Since all of these devices are essentially low speed/torque units they cannot nearly compete with conventional high speed electric motors which are reliable and effective for practically all electrical power applications. Since electric motors can easily be designed for all sorts of starting, load and environmental conditions they have natually gained a wide market acceptance.

Various types of permanent magnet, magnetic (motors) have been evolved with most of the designs based on reciprocating discs and linkage, with alternating shields used to make and break the respective magnetic fields. All of these known pulsed, reciprocating units are impractical because of very short power strokes, low natural frequency and cyclic torque output.

Some of the rotary types of permanent magnet "motors" are nothing more than magnetic couplings since there is no direct and continuous magnetic leverage or torque stepup involved in their geometry.

Any type of rotating magnetic geometry in which the driven member-disc can also drive the other disc can only have the value of a magnetic coupling since there is no torque increase, with the important element of a backstop or pawl action present. To be practical, any magnetic torque converter using permanent magnets must provide either uniform attraction or repulsion from radial bar magnets on a small diameter rotor to a magnetic segmented wheel. The smaller rotor should require a minimum of input torque and the larger wheel should not be capable of back-revolving the small rotor.

The magnetic couple described has a machanical counterpart in the standard worm and worm-wheel, where a high speed worm drives a low speed wheel, and not visa-versa. For a single pitch worm there is a complete backstopping action on the wheel and a high mechanical advantage is evident.

Using the principal of the worm and worm wheel, a practical magnetic torque converter is possible with attractive prospects for a sizable torque stepup due to skewed mutual attraction between the opposite magnetic segments, although the magnets sets are revolving at right angles to each other, or nearly so.

When a permanent magnet, -magnetic torque converter is arranged in this manner, with a small high speed magnetic helical rotor revolving at a right angle to a large segmented magnet wheel, and in-line with the plane of the wheel, then the geometry is attractive for achieving practical dynamic magnetic torque conversion. It is desirable to keep the magnet segment spacing close on the large wheel/disc so that the multiple magnets on the small helical rotor can displace the wheel magnet segments in small increments with a corresponding large magnetic flux between the opposite magnet sets.

A magnetic torque converter differs from the concept of a magnetic motor in regard to a self-starting feature and input torque. A magnetic torque converter requires a continuous input torque for the small magnetic driving rotor, while a standard electric motor is always self-starting with full electrical power utilization.

The ideal magnetic torque converter provides a sizable and useful torque step-up at the large disc/wheel based on the magnitude of the magnetic flux between the opposite permanent magnet sets on each of the two revolving components. A side advantage for this manner of magnetic torque transfer using individual, opposite magnetic segments is that no friction is imposed between the two components as in the case of the mechanical contacting worm and wormwheel counterparts. The helical magnetic "worm" can run at high speed without surface-contact with a reduced-from-normal rated torque input due to the skewed magnetic attraction from the driven magnetic disc/wheel. It is almost desirable to use large and powerful permanent magnets for both opposite sets of magnetic components to achieve a large torque output differential between the driver and driven shafts.

Although the magnetic torque converter may also work by mutual repulsion of the opposite magnetic segment sets, it appears that the advantage of reduced torque input with the mutual attracting magnet sets makes the attraction of opposite magnetic poles a better mode of operation. It is most important that the magnet segments have a uniform lifting power so that the torque input and output is smooth and continuous, without any choppy and unsmooth rotation.

There are several important power applications waiting to be filled with effective, high-power magnetic torque converters, such as auxiliary home power systems and practical, low-cost electric vehicles. At the present time progress on electric vehicles is greatly restricted due to the lack of long-life, low-cost electric batteries. A high power magnetic torque converter can bridge the gap caused by ineffective batteries by providing a useful power step-up from available batteries to the electric drive motor, to improve overall electric vehicle economics, and operation.

SUMMARY OF THE INVENTION

The magnetic torque converter is comprised of two rotating components, -one driving, small helical rotor fitted with identical permanent magnets which are equally spaced at the helix periphery. The second, -a driven large disc/wheel is fitted with corresponding equally spaced permanent magnets at the outside diameter/-periphery.

The two components, -the driving helical rotor and the large driven disc/wheel are arranged in a "worm and worm-wheel" relationship, with the input and output axes at right angles, or nearly so, to each other. It may be possible to gain some torque or speed advantage by having the two rotating components skewed at an angle other than 90°, which must be evolved by experimentation.

It will be necessary to maintain close spacing, consistant with adjacent isolation, between individual magnets on both the small helical rotor and the large driven disc to assure uniform segment displacement and an optimum dynamic magnetic flux between the two rotating components.

Each magnet segment may be directly bonded to a non-magnetic disc material, or may be clamped on with non-magnetic straps for ease of replacement and dynamic balancing. The large driven disc must be rigid and rigidly mounted on ball bearings for free, low-friction rotation.

Since the driving helical rotor will usually run at high speed, it is necessary to securely clamp on the magnet segments onto the non-magnetic helical rotor form material, so that they may be slightly shifted, but locked, to maintain dynamic balance and retention, respectively.

The driving helical rotor must also be rigidly mounted on high quality ball bearings to restrain the reactions from the dynamic magnetic attraction between the two magnetic components. The air gap — (approx. 0.020 inches) on the common centerline between the two rotating components must be held to this practical minimum in order to obtain the highest possible magnetic attractive force between the two sets of moving magnetic segments.

The magnets selected for both components must be uniformly identical in size and have the highest possible uniform magnetic lift rating. Squarish or rectangular Alnico or ceramic magnets are generally suitable for this application, and there is no theoretical limit to the size of both components. A practical limit to the actual size of the components is imposed by weight and material capability restrictions, but nearly any practical number or size of uniformly identical magnets may be used to make up the magnetic torque converter components.

The principal object of the invention is to provide the highest possible torque output for the large, driven disc/wheel from the lowest possible torque input at the small helical rotor, as a useful power stepup means for many electrical generating applications.

Another object of the invention is to provide a step-up power source which can be produced at moderate cost, requires no combustible fuel and is nonpolluting, runs silently and requires a minimum of parts replacement and maintenance.

The various objects of the invention with its design features will be more apparent from the following description and drawings which illustrate the preferred embodiment. It should be understood that variations may be made in the various components without departing from the spirit and scope of the invention, as described.

A Disclosure Document has been filed with the Office which describes portions of this magnetic torque converter:

No. 056,006 — Permanent Magnet Device. (Dec. 7, 1976.)

Referring to the Drawings:

FIG. 3 is an external end view of an alternate arrangement for the magnetic torque converter.

FIG. 4 is an enlarged detail of the adjustable mounting arrangement for each magnetic segment.

Figure 1:
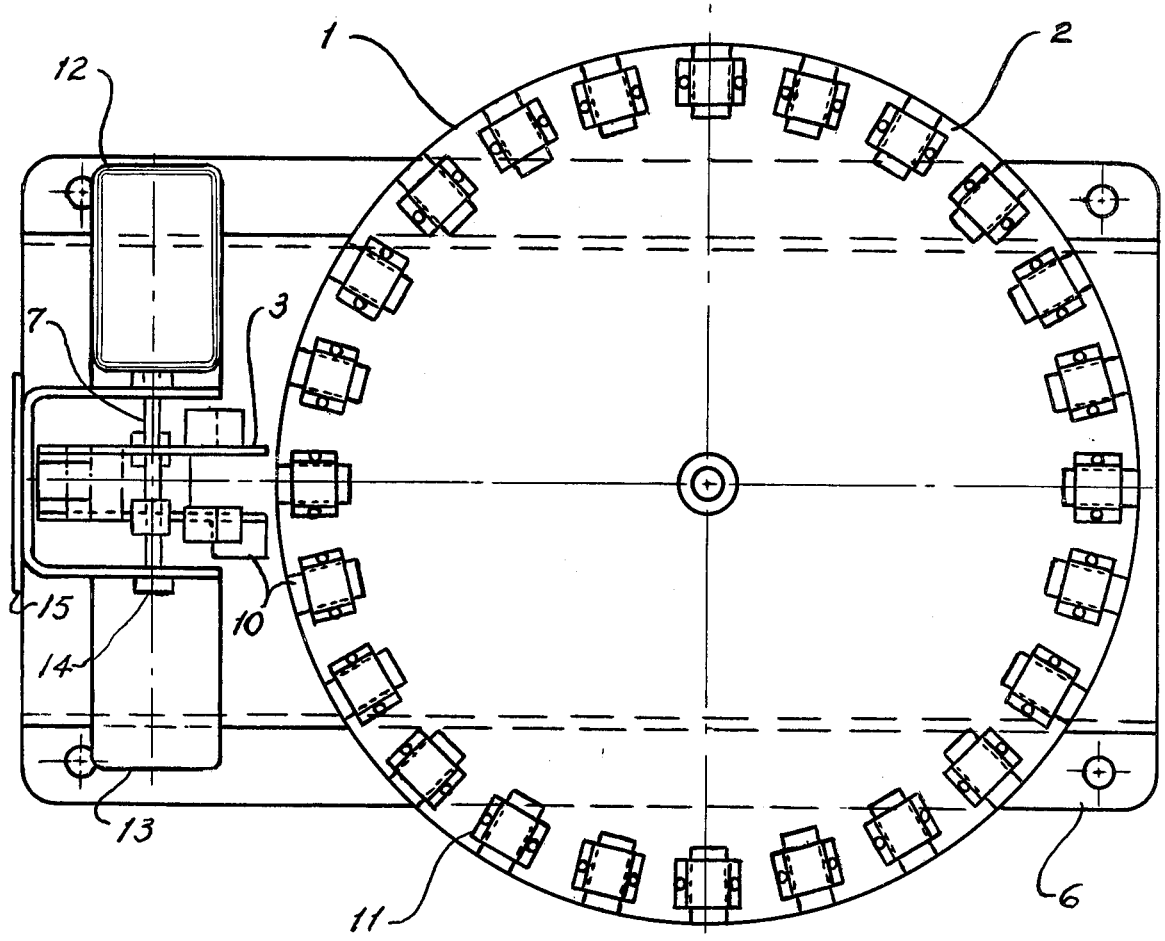
FIG. 1 is a top, external view of the magnetic torque converter.
Figure 2:
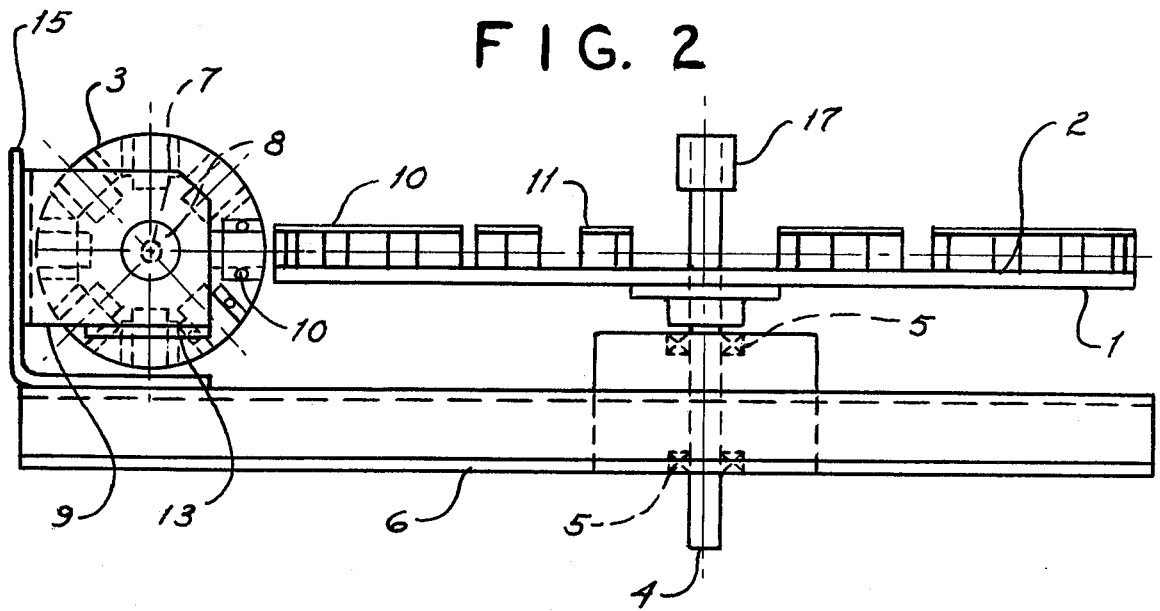
FIG. 2 is an external side view of the magnetic torque converter.

DESCRIPTION OF THE PREFERRED EMBODIMENT:

The magnetic torque converter 1, is comprised of two basic components, —the large, driven disc/wheel 2, and the small, driving helical rotor 3, which correspond to, and are arranged as, a worm and worm wheel mechanical drive. Both the small helical rotor 3, and large disc/wheel 2, are made of durable, non-magnetic metals.

A shaft 4, and ball bearings 5, within a mounting base 6, support the large, driven disc/wheel 2, so that it revolves freely and transmits the output torque to a load.

A shaft 7, and ball bearings 8, within a support bracket 9, support the small driving helical rotor 3, so that it revolves freely and transmits a continuous magnetic force to the large, driven disc/wheel 2.

Each magnet segment 10, is secured to the large, driven disc/wheel 2, with non-magnetic clamps 11, and standard mounting hardware. The magnet segments 10, are equally spaced around the periphery of the disc/wheel 2, and held to a spacing distance which is nearly equal to the pitch of the small, driving — helical rotor 3.

Each magnet segment 10, is secured to the lateral surfaces of the small helical rotor 3, with the non-magnetic clamps 11, and standard mounting hardware. The magnet segments 10, are equally and closely spaced around the helical periphery of the small helical rotor 3.

The pitch of the small helical rotor 3, is not less than 1/6 the helical rotor diameter, nor more than ½ the helical rotor diameter.

The small, driving helical rotor 3, is driven by any suitable D. C. or A. C. electric motor 12, which is secured to extension mounts 13, at the sides of the support bracket 9. The electric motor 12, may be connected to either side of the shaft 7, by means of the coupling 14, to provide either direction of rotation for the small helical rotor 3.

The support bracket 9, may be angularly rotated to provide an angle other than 90° between the two revolving components 2 and 3. The support bracket 9, can be tilted and locked on the end bracket 15, which is secured to the mounting base 6. A series of corresponding holes 16, within both the support bracket 9, and the end bracket 15, allow the small, — driving helical rotor 3, to be set at a right angle, or several other angles, in either direction, up to approximately thirty degrees.

Standard mounting hardware is fitted into the selected sets of corresponding holes 16, to securely lock the support bracket 9, to the end bracket 15.

Either end of the shaft 4, will be coupled to an electric alternator or generator, not shown, by means of the coupling 17.

The electric motor 12, may be powered by an array of solar photovoltaic cells, not shown.

Having thus described the preferred embodiment of the invention, I claim:

1. A magnetic torque converter comprising two basic rotating components,
   a large flat non-magnetic disc containing multiple equally spaced identical permanent magnets arrayed so that their common poles (N) are exposed at the periphery,
   a driving helical non-magnetic rotor containing identical equally spaced permanent magnets arrayed so that their common opposite poles (S) are exposed at the outer helical surface, arrangement of said large flat non-magnetic disc and said driving helical non-magnetic rotor on a common centerline with rotating axes at a right angle to each other, support means for said large flat non-magnetic disc including an elongate base and shaft with ball bearing means, support means for said driving helical non-magnetic rotor including supporting brackets and shaft with ball bearing-means, securing of said supporting brackets onto said elongate base, securing and locking means for each of said equally spaced permanent magnets onto said large flat non-magnetic disc and said driving helical non-magnetic rotor, electric motor drive means for the shaft of said driving helical non-magnetic rotor, a coupling securing said electric motor to said shaft of the driving helical non-magnetic rotor, a coupling secured to the shaft of said large flat non-magnetic disc.

2. A magnetic torque converter according to claim 1 in which said equally spaced permanent magnets are of squarish or rectangular flat form and made from standard iron-nickel-al. magnetic alloy, said equally spaced permanent magnets range in size and power from a minimum of 5 pounds lifting power to a maximum of 250 pounds lifting power.

3. A magnetic torque converter according to claim 1 wherein the pitch of said driving helical non-magnetic rotor is not less than 1/6 the said helical rotor diameter nor more than ½ the said helical rotor diameter, said driving helical non-magnetic rotor is fabricated from a durable non-magnetic metal and formed as a constant diameter helical disc.

4. A magnetic torque converter according to claim 1 in which said electric motor drive means is a direct current type of a size and rating consistent with the size of said magnetic torque converter, a direct current type of said electric motor drive means powered by multiple solar photovoltaic cells.

5. A magnetic torque converter according to claim 1 wherein said coupling secured to the shaft of said large flat non-magnetic disc is secured to an electric alternator to produce low voltage direct current electric power.

6. A magnetic torque converter comprising two basic components, a large flat non-magnetic disc containing multiple equally spaced identical permanent magnets arrayed so that common poles (S) are exposed at the periphery, a driving helical non-magnetic rotor containing multiple equally spaced identical permanent magnets arrayed so that common poles (N) are exposed at the periphery, arrangement of said large flat non-magnetic disc and driving helical non-magnetic rotor on a common centerline with rotating axes at an angle other than ninety degrees in either direction, support means for said large flat non-magnetic disc including an elongate base and shaft with ball bearing means, support means for said driving helical non-magnetic rotor including supporting brackets and shaft with ball bearing means, securing of said supporting brackets onto said elongate base, locking of said driving helical non-magnetic rotor supporting brackets at an angle other than ninety degrees in relation to said large flat non-magnetic disc, securing and locking means for each of said equally spaced permanent magnets onto said large flat non-magnetic disc and said driving helical non-magnetic rotor, electric motor drive means for the shaft of said driving — helical non-magnetic rotor, a coupling securing said electric motor to said shaft of the driving helical non-magnetic rotor.

7. A magnetic torque converter according to claim 6 in which said equally spaced permanent magnets are of squarish or rectangular flat form and made from conventional magnetic ceramic, said equally spaced permanent magnets range in size and lifting power from a minimum of ten pounds to a maximum of 350 pounds lifting power.

8. A magnetic torque converter according to claim 6 wherein the pitch of said driving helical non-magnetic rotor is equal to the spacing of the multiple equally spaced identical permanent magnets contained on said large flat non-magnetic disc, said driving helical non-magnetic rotor is fabricated from high strength aluminum alloy and formed as a single pitch helical disc.

9. A magnetic torque converter according to claim 6 in which said electric motor drive means is an alternating current type unit and of any size and rating consistent with the size of said magnetic torque converter, an alternating current type of said electric motor drive means connected to a convenient conventional alternating current power source.

10. A magnetic torque converter according to claim 6 wherein a coupling is secured to the shaft of said large flat non-magnetic disc, connection of said coupling to an electric alternator to produce alternating current at 110 volts.

* * * * *